(12) United States Patent
Beall et al.

(10) Patent No.: US 6,214,471 B1
(45) Date of Patent: Apr. 10, 2001

(54) GLASSES COMPATIBLE WITH ALUMINUM

(75) Inventors: Douglas M. Beall, Painted Post; George H. Beall, Big Flats, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/433,111

(22) Filed: Nov. 3, 1999

Related U.S. Application Data

(60) Provisional application No. 60/106,868, filed on Nov. 3, 1998, and provisional application No. 60/106,866, filed on Nov. 3, 1998.

(51) Int. Cl.$^7$ ............................................. B32B 15/00
(52) U.S. Cl. ........................... 428/433; 428/34; 428/426; 428/427; 428/544; 428/546; 428/610; 428/621; 428/633; 501/19; 501/41; 501/47; 501/48; 501/49; 501/50; 501/52; 501/32
(58) Field of Search ................................... 428/544, 546, 428/610, 621, 633, 34, 426, 427, 433; 501/41, 19, 47, 48, 49, 50, 52, 32

(56) References Cited

U.S. PATENT DOCUMENTS

| | | | |
|---|---|---|---|
| 4,038,576 | 7/1977 | Hallais et al. | 313/101 |
| 4,049,872 | 9/1977 | Hang | 428/427 |
| 4,199,704 | 4/1980 | Varshneya et al. | 313/221 |
| 4,291,107 | 9/1981 | Barry et al. | 429/104 |
| 4,699,831 | 10/1987 | Hartmann et al. | 428/35 |
| 5,015,530 | 5/1991 | Brow et al. | 428/433 |
| 5,043,302 | 8/1991 | Mattox | 501/17 |
| 5,104,738 | 4/1992 | Brow et al. | 428/433 |
| 5,153,070 | * 10/1992 | Andrus et al. | 428/408 |

FOREIGN PATENT DOCUMENTS

| | | |
|---|---|---|
| 1174300 | 12/1969 | (GB) . |
| 1-141835 | 6/1989 | (JP) . |

* cited by examiner

*Primary Examiner*—Deborah Jones
*Assistant Examiner*—Lymarie Miranda
(74) *Attorney, Agent, or Firm*—Milton M Peterson

(57) ABSTRACT

A family of aluminoborate glasses that are compatible with aluminum at elevated temperatures, and an article comprising such a glass with either an aluminum coating, or with aluminum particles dispersed within the glass, whereby the glass may be rendered polarizing. The base glass consists essentially of, 15–85% $B_2O_3$, 5–45% $Al_2O_3$ and 10–75% $Li_2O+RO$, where RO represents the alkaline earth metal oxides MgO, CaO, SrO and BaO, and is free of oxides reacting with aluminum at elevated temperatures.

14 Claims, No Drawings

GLASSES COMPATIBLE WITH ALUMINUM

This application claims the benefit of U.S. Provisional Application, Serial No. 60/1106,868, filed Nov. 3, 1998 entitled GLASSES COMPATIBLE WITH ALUMINUM, by D. M. Beall and G. H. Beall.

RELATED APPLICATIONS

Provisional Application No. 60/106,866, filed Nov. 3, 1998 entitled UV-VISIBLE LIGHT POLARIZER AND METHODS, by G. H. Beall, N. F. Borrelli, D. F. Dawson-Elli, N. J. Visovsky and C. B. Moore.

FIELD OF THE INVENTION

Aluminoborate glasses that do not react with aluminum at elevated temperatures, and articles in which such glasses are combined with aluminum.

BACKGROUND OF THE INVENTION

There are numerous applications where it is desirable to provide an aluminum film or coating on glass. These include light reflecting films, such as on mirrors and lamp envelopes, and electrically conducting films.

Such aluminum films function quite satisfactorily at ambient, or low, temperatures. However, at elevated temperatures, there is a strong tendency for aluminum to react with conventional, silicate and phosphate glasses to form the oxide, $Al_2O_3$. In silicate and phosphate glasses, the $SiO_2$ and $P_2O_5$ are reduced to the elemental state. This, of course, is usually quite unacceptable.

Efforts to dissolve aluminum in a conventional glass, and to precipitate it out as colloidal metal, were also unsuccessful. The metal became oxidized, and incorporated in the glass composition, during batch melting.

The present invention is based on the discovery that a family of glasses is compatible with, and does not react with, aluminum, even at elevated temperatures. Accordingly, a basic purpose of the invention is to provide such family of aluminum-compatible glasses.

Another purpose is to provide glasses in which aluminum can be dissolved, and then precipitated out in colloidal form.

A further purpose is to provide a novel, polarizing glass utilizing a glass containing precipitated, aluminum metal particles.

SUMMARY OF THE INVENTION

The invention resides, in part, in a family of aluminoborate glasses that is compatible with aluminum at elevated temperatures, and that consists essentially of, as calculated in weight percent on an oxide basis, 15–85% $B_2O_3$, 5–45% $Al_2O_3$ and 10–75% $Li_2O+RO$, where RO represents the alkaline earth metal oxides MgO, CaO, SrO and BaO.

The invention further resides in an aluminoborate glass article having aluminum applied to the glass surface, or dispersed within the bulk glass.

The invention also resides in a polarizing, glass article comprising elongated, aluminum particles dispersed in an aluminoborate glass.

DESCRIPTION OF THE INVENTION

The present invention is based on discovery of a family of aluminoborate glasses that are compatible with aluminum metal at elevated temperatures. This means that the glasses in this composition family do not react with aluminum. In particular, they do not oxidize the aluminum to the oxide state, $Al_2O_3$. This is in contrast to silicate and phosphate glasses which do so react with aluminum. The traditional glass-formers, $SiO_2$ and $P_2O_5$, are reduced by aluminum to produce Si, Si—Al alloys, AlP, and the like. In turn, the aluminum is at least partly oxidized to $Al_2O_3$.

A composition of the present invention consists essentially of, as calculated in weight percent on an oxide basis, 15–85% $B_2O_3$, 5–45% $Al_2O_3$ and 10–75% $Li_2O+RO$. RO represents the alkaline earth metal oxides, MgO, CaO, SrO and/or BaO.

These glasses are based on $B_2O_3$ and $Al_2O_3$ as glass-formers. They do not react with aluminum, except in the presence of a modifying or accessory oxide that is reducible by aluminum. Therefore, most other, glass component oxides, including ZnO, PbO, $Na_2O$, and $K_2O$, must be avoided in the present glass compositions.

As a practical matter, it has been found that $Li_2O$ and the alkaline earth metal oxides (RO) are the only glass modifiers that do not show appreciable reduction in the temperature range of 1200–1450° C. This is the temperature range within which aluminoborate glasses are melted. $Li_2O$ and the alkaline earth metal oxides function to facilitate melting and to provide a stable glass. They also permit varying physical properties in the glasses.

Preferred compositions consist essentially of 25–40% $B_2O_3$, 20–40% $Al_2O_3$ and 10–45% RO where RO is constituted by 0–35% CaO, 0–45% BaO, 0–10% MgO and 0–30% SrO. A preferred composition is a calcium aluminoborate glass that contains 32% CaO, 38% $Al_2O_3$ and 30% $B_2O_3$.

In one form of the inventive article, an aluminum film, or coating, is applied to a glass surface. Such articles are well-known. In the absence of elevated temperatures, either in processing or in use, no reaction problem arises with the article. The glass can then be selected on the basis of other properties. However, where an elevated temperature is involved, either in processing or in use, the need for the present glass becomes evident.

In another form of the inventive article, the aluminum is present as aluminum metal particles mixed in the glass batch. In this case, it has been found that up to about 1% by weight of aluminum metal can be successfully added to the glass batch for present purposes. The aluminum metal dissolves in the glass melt, but is not oxidized to $Al_2O_3$. Rather, when the glass is cooled and then thermally treated, the aluminum metal precipitates out as colloidal, aluminum particles.

A particular application for the solution and precipitation procedure is a polarizing, glass article. After the aluminum articles are precipitated in the glass, the glass is then heated to a suitable temperature, and is stretched to elongate the aluminum particles. The stretching should be done with such force as to provide an aspect ratio of at least 2:1, preferably an aspect ratio between 2:1 and 5:1. This enables the particles to polarize light entering the glass from an external source, such as a laser.

TABLE I presents typical glass compositions for glasses within the present, aluminoborate family, that is, glasses compatible with aluminum metal. The compositions are set forth in weight percent. In those compositions where aluminum is shown as the metal Al, it is added as metal particles in excess of the base glass oxides which total 100%.

TABLE I

| wt. % | 1 | 2 | 3 | 4 | 5 | 6 |
|---|---|---|---|---|---|---|
| $B_2O_3$ | 62.8 | 25.4 | 20.2 | 35.3 | 25.0 | 80.0 |
| $Al_2O_3$ | 7.7 | 16.8 | 5.9 | 25.9 | 40.5 | 8.0 |
| MgO | — | — | — | — | — | — |
| CaO | 29.5 | — | — | — | 34.5 | — |
| SrO | — | — | — | — | — | — |
| BaO | — | 56.0 | 73.8 | 38.9 | — | — |
| $Li_2O$ | — | — | — | — | — | 12.0 |
| Al* | — | — | — | — | 0.5 | 0.2 |
|  | clear | clear | clear | clear | clear | blue w/grey-purp streaks |
| 600° C. 4 hours | — | — | — | — | — | — |

| wt. % | 7 | 8 | 9 | 10 | 11 | 12 |
|---|---|---|---|---|---|---|
| $B_2O_3$ | 55.7 | 51.9 | 44.4 | 51.1 | 61.0 | 53.8 |
| $Al_2O_3$ | 32.2 | 23.9 | 28.1 | 26.8 | 28.0 | 24.7 |
| MgO | — | — | — | — | 11.0 | 5.5 |
| CaO | — | — | — | — | — | — |
| SrO | — | 24.2 | — | — | — | — |
| BaO | — | — | 24.1 | 16.1 | — | 16.0 |
| $Li_2O$ | 12.1 | — | 3.0 | 6.0 | — | — |
| Al* | 0.6 | 0.1 | 0.2 | 0.2 | 0.4 | 0.2 |
|  | grey | clear | grey | blue | pale grey | grey |
| 600° C. 4 hours | — | — | — | grey | — | — |

*added in excess of 100%

Glass melts, based on the compositions of TABLE I, were produced by mixing batches, generally 4.5 kg. (2 lb.) batches, employing conventional, glass batch components. The exception, as noted above, was when aluminum metal particles were incorporated in the glass batch. The glass batches, thus prepared, were placed in alumina crucibles for melting. They were melted in an electric furnace on an overnight schedule. The melting temperature was in the range of 1200–1450° C. depending on the glass.

TABLE I also shows the color of the glass produced, and of articles formed therefrom. The melts generally give a typical, grey glass where aluminum has precipitated upon cooling the glass. In other cases, a blue color results. The latter color is presumed to be due to anion defects in the glass structure caused by aluminum dissolution. When reheated at about 600° C., the normal, grey color of colloidal aluminum appears.

Some melts gave a clear, essentially uncolored glass. This was caused either because aluminum was not included in the batch, or because it was oxidized by the air environment before the meting took place. The latter indicates the need to maintain a neutral, or slightly reducing, atmosphere in a furnace, at least until the glass is melted.

We claim:

1. A family of aluminoborate glasses that is compatible with aluminum metal at elevated temperatures, that consists essentially of, as calculated in weight percent on an oxide basis, 15–85% $B_2O_3$, 5–45% $Al_2O_3$ and 10–75% $Li_2O$+RO, where RO represents the alkaline earth metal oxides MgO, CaO, SrO and BaO, and that is free of oxides reacting with aluminum.

2. A family of aluminoborate glasses in accordance with claim 1 wherein the compositions contain up to 15% $Li_2O$.

3. A family of aluminoborate glasses in accordance with claim 1 wherein RO is BaO.

4. A family of aluminoborate glasses in accordance with claim 1 wherein RO is one or more oxides selected from 0–75% BaO, 0–35% CaO, 0–15% MgO and 0–25% SrO.

5. A family of aluminoborate glasses in accordance with claim 1 which further contains up to about 1% aluminum metal particles.

6. A family of aluminoborate glasses in accordance with claim 5 which consists essentially of 25–40% $B_2O_3$, 20–40% $Al_2O_3$ and 10–45% RO where RO is constituted by 0–35% CaO, 0–45% BaO, 0–10% MgO, and 0–30% SrO.

7. A calcium aluminoborate glass that consists of 32% CaO, 38% $Al_2O_3$ and 30% $B_2O_3$.

8. An article comprising an aluminoborate glass in combination with aluminum metal, the aluminum metal being applied to the surface of the glass, or being dispersed as particles within the bulk glass.

9. An article in accordance with claim 8 wherein an aluminum film is applied over at least a portion of the article surface.

10. An article in accordance with claim 8 wherein aluminum particles are dispersed within the bulk glass.

11. An article in accordance with claim 10 wherein the aluminum particles constitute up to about 1% by weight of the glass.

12. A polarizing, glass article comprising elongated, aluminum particles dispersed in an aluminoborate glass.

13. A polarizing, glass article in accordance with claim 12 wherein the aluminum particles constitute up to about 1% by weight of the article.

14. A polarizing, glass article in accordance with claim 12 wherein the aluminum particles have an aspect ratio of at least 2:1.

* * * * *